United States Patent
Duffy et al.

(10) Patent No.: US 8,359,604 B2
(45) Date of Patent: Jan. 22, 2013

(54) PROPAGATING UNOBSERVED EXCEPTIONS IN A PARALLEL SYSTEM

(75) Inventors: John Duffy, Renton, WA (US); Stephen Toub, Seattle, WA (US); Huseyin Yildiz, Kenmore, WA (US); Mike Liddell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1037 days.

(21) Appl. No.: 12/357,850

(22) Filed: Jan. 22, 2009

(65) Prior Publication Data
US 2010/0185840 A1 Jul. 22, 2010

(51) Int. Cl.
*G06F 3/00* (2006.01)
(52) U.S. Cl. ........................................ 719/318
(58) Field of Classification Search .................. None
See application file for complete search history.

(56) References Cited

U.S. PATENT DOCUMENTS

| | | | | |
|---|---|---|---|---|
| 5,784,613 | A * | 7/1998 | Tamirisa | 718/100 |
| 6,823,448 | B2 | 11/2004 | Roth et al. | |
| 7,007,198 | B2 | 2/2006 | Boling | |
| 2002/0029299 | A1* | 3/2002 | Kappel et al. | 709/318 |
| 2002/0161816 | A1* | 10/2002 | Kawahara et al. | 709/103 |
| 2004/0098724 | A1* | 5/2004 | Demsey et al. | 718/104 |
| 2006/0101411 | A1 | 5/2006 | Selitrennikoff et al. | |
| 2006/0271771 | A1* | 11/2006 | Cartony et al. | 712/244 |
| 2006/0277552 | A1* | 12/2006 | Nall et al. | 718/108 |
| 2008/0120299 | A1 | 5/2008 | Duffy et al. | |
| 2008/0127205 | A1* | 5/2008 | Barros | 719/313 |

OTHER PUBLICATIONS

"Waiting for Tasks", Retrieved at<<http://blogs.msdn.com/pfxteam/archive/2008/08/05/8835612.aspx>>, pp. 7, Aug. 5, 2008.
Miller, et al. "The Guardian Model and Primitives for Exception Handling in Distributed Systems", Retrieved at<<http://ieeexplore.ieee.org/stamp/stamp.jsp?arnumber=01377194>>, IEEE Transactions on Software Engineering, vol. 30, No. 12, Dec. 2004, pp. 1008-1022.
Duffy Joe, "Concurrent Programming with Parallel Extensions to .NET", Retrieved at<<http://jaoo.dk/file?path=/jaoo-aarhus-2008/slides//JoeDuffy_PFX.pdf>>, Oct. 2008, pp. 36.
"Task Parallel Library Changes Since the MSDN Magazine article", Retrieved at<<http://blogs.msdn.com/pfxteam/archive/2007/11/29/6558543.aspx>>, Oct. 16, 2008, pp. 8.
Tripathi, et al. "Exception Handling in Agent-Oriented Systems", Retrieved at<<http://www.springerlink.com/content/lk8b1bcaq8h63exm/fulltext.pdf>>, LNCS 2022, 2001, pp. 19.
Martinez, et al. "Implementing Transactions using Ada Exceptions: Which Features are Missing?", Retrieved at<<lsd.ls.fi.upm.es/lsd/papers/2001/adaletters01.ps>>, pp. 12, 2001.
Birrell, "An Introduction to Programming with C# Theads", Retrieved at <<http://birrell.org/andrew/papers/ThreadsCSharp.pdf>>, 40 pgs, 2003.
Gordon, "Exploring the CLR", Retrieved at <<http://www.informit.com/articles/article.aspx?p=99977&seqNum=6>>, 63 pgs, Aug. 15, 2003.

(Continued)

*Primary Examiner* — S. Sough
*Assistant Examiner* — Carina Yun

(57) ABSTRACT

A method of handling an exception in a parallel system includes constructing a task object, executing a method with the task object, and catching an exception with the task object during execution of the method. The exception is propagated in response to the task object becoming inaccessible without the exception having been observed.

17 Claims, 3 Drawing Sheets

OTHER PUBLICATIONS

Duffy, "Generalities & Details: Adventures in the High-Tech Underbelly", Retrieved at <<http://www.bluebytesoftware.com/blog/2008/02/18/IDisposableFinalizationAndConcurrency.aspx>>, 8 pgs, Feb. 18, 2008.

MSDN Magazine, "Thread Synchronization", Retrieved at <<http://msdn.microsoft.com/en-us/library/dsw9f9ts.aspx>>; 2 pgs, Jan. 22, 2009.

MSDN Magazine, "Garbage Collection: Automatic Memory Management in the Microsoft .Net Framework", Retrieved at <<http://msdn.microsoft.com/en-us/magazine/bb985010.aspx>>; 10 pgs, Jan. 22, 2009.

Romanovsky, A. et al., "Except for Exception Handling . . . ", Workshop on exception handling for a 21st century programming language, Ada Europe 2001, Ada Letters XXI:3 (Sep. 2001), 19-25.

Lea, Doug, "A Java Fork/Join Framework", Proceedings, ACM JavaGrande Conference, Jun. 2000.

\* cited by examiner

PROPAGATING UNOBSERVED EXCEPTIONS IN A PARALLEL SYSTEM

BACKGROUND

Software programs have been written to run sequentially since the beginning days of software development. Steadily over time, computers have become much more powerful, with more processing power and memory to handle advanced operations. This trend has recently shifted away from ever-increasing single-processor clock rates towards an increase in the number of processors available in a single computer resulting in a corresponding shift away from sequential execution toward parallel execution. Software developers want to take advantage of improvements in computer processing power to enable their software programs to run faster as new hardware is adopted. With parallel hardware, software developers arrange for one or more tasks of a particular software program to be executed in parallel (also referred to as concurrently), so that, for example, the same logical operation can utilize many processors at one time to thereby deliver better performance as more processors are added to the computers on which such software runs.

During software development, software code is tested and debugged using software development tools generally referred to as debuggers. Debuggers can view and track exceptions that occur when executing the software code. When an exception occurs, the debugger may notify a user (i.e., programmer) that an exception occurred and allow the user to choose a course of action, such as terminating execution or attempting to restart execution at the instruction that failed. An exception is a bundle of information that is propagated through the program using a means of flow control referred to as "exception handling." The initiation of exception handling for a given exception is referred to as "throwing" the exception. An exception may be thrown due to hardware errors, software errors, or to take advantage of the exception handling as a control flow mechanism. Exception handling can be more complex in a parallel system.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, a method of handling an exception in a parallel system includes constructing a task object, executing a method with the task object, and catching an exception with the task object during execution of the method. The task object determines whether the exception is likely to be observed, and re-throws the exception when it is determined that the exception is not likely to be observed. The exception is propagated in response to the task object becoming inaccessible without the exception having been observed.

In one embodiment, a monitoring object is created by the task object in response to the exception. The monitoring object re-throws the exception in response to the task object being waited on by another object. The monitoring object includes a finalization method that is executed by a garbage collection system to re-throw the exception in response to the task object becoming inaccessible by being garbage collected without the exception having been observed.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

Figure 1:
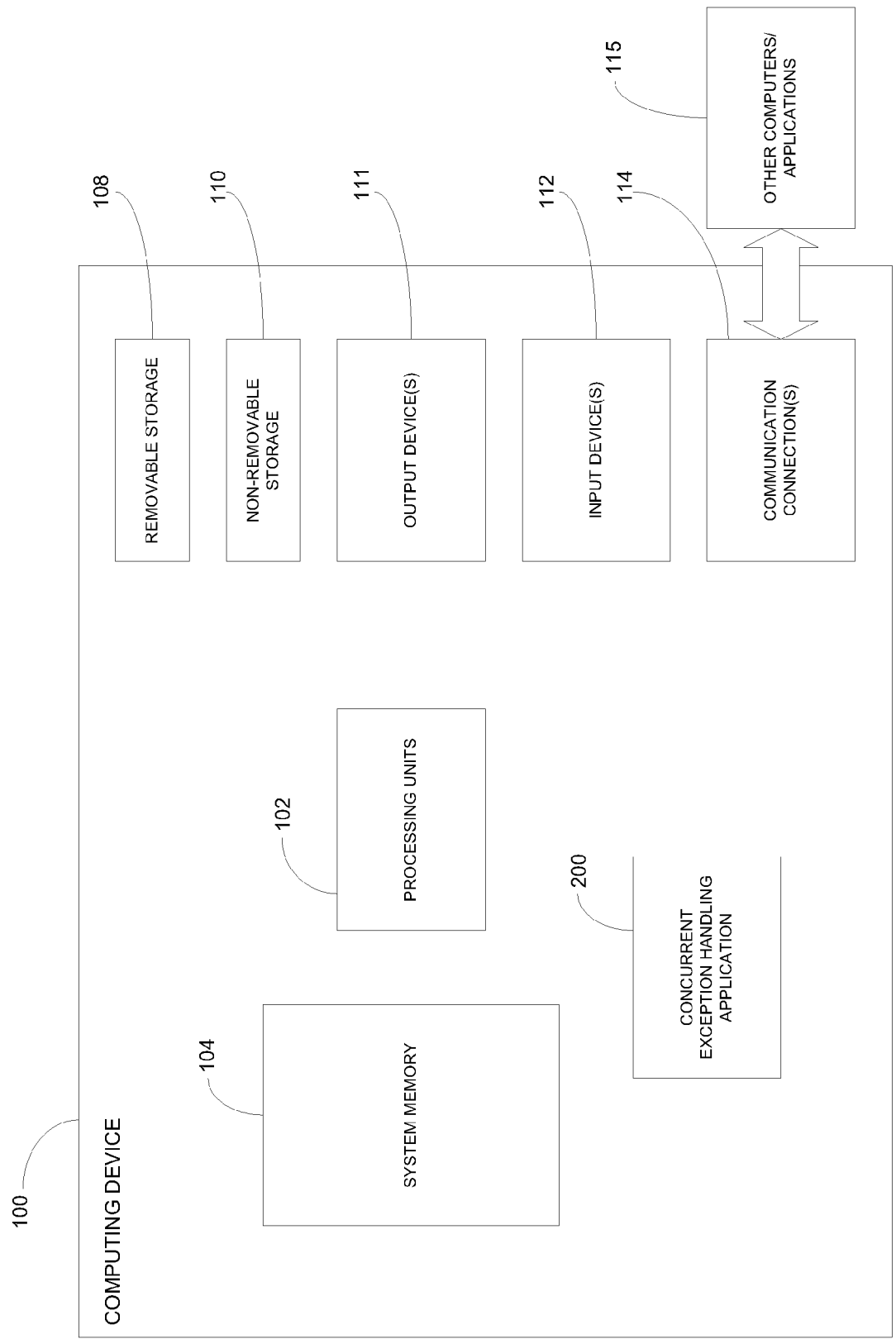
FIG. 1 is a diagram illustrating a computing system suitable for performing concurrent exception handling according to one embodiment.

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides a concurrent exception handling application, but the technologies and techniques described herein also serve other purposes in addition to these. In one implementation, one or more of the techniques described herein can be implemented as features within a framework program such as Microsoft® .NET Framework, or within any other type of program or service.

A call stack consists of a set of stack frames, one for each procedure invocation, where each stack frame includes information about the parameters, local and temporary variables, and enough program state to resume execution when a procedure returns. During runtime, a typical stack frame is created and pushed onto the call stack when a procedure is called, and then popped or removed from the call stack when the associated procedure exits. The call stack therefore, represents a structure of dynamically nested procedures that are active within one thread of execution of the program at any given time. In each call stack, only one function can be currently executing (the function whose call frame is currently at the head of the stack), but there can be multiple stacks.

When an improper event or error arises during execution of a program, an exception may be signaled from within the executing procedure. Exception handling often involves the ability to remove or "unwind" a number of frames from the call stack in order to transfer control to an exception handling procedure that may have been instituted by some caller higher up in the stack. Stack unwinding in the presence of an exception involves the process of removing the stack frames from the call stack one at a time until a stack frame is encountered that represents a procedure that is willing to handle the exception.

Exception handling and stack unwinding can be more complex in a parallel system. Data parallel systems typically operate by partitioning input data into disjoint subsets (partitions) so that independent concurrent tasks of execution operating on different threads may process the separate subsets in isolation. In one embodiment, exceptions that occur in concurrent tasks are caught and forwarded to a coordination task (or forwarded to some other code that's waiting on the results of the tasks). These exceptions are then aggregated into an aggregation structure, such as an aggregate exception object, and re-thrown by the coordination task. The aggregation structure may then be caught and the individual exceptions inside handled by the program.

In one embodiment, exceptions are handled in a program once all concurrent tasks have completed. A coordination task initializes a shared flag and a shared list of exceptions to be aggregated. Concurrent worker tasks are started, and when one throws an exception, the shared flag is set and the exception is forwarded to the coordination task and added to the shared list. The worker tasks each poll the flag to determine whether it has been set, and voluntarily terminate when the flag is set. If any additional exceptions occur on concurrent tasks before they are able to voluntarily terminate, those additional exceptions are added to the shared list. After all of the concurrent worker tasks terminate, an aggregate exception object is created by the coordination task containing references to each of the exceptions in the shared list, and then the aggregate exception object is thrown by the coordination task.

After an aggregate exception object is thrown according to one embodiment, the object is caught by a catch handler. In one embodiment, the catch handler supplies one or more exception handler functions, each of which includes an exception type and a handler function. For each of the exceptions in the aggregate exception object, the system determines if the exception is one of the types handled by the handler functions. If it is, the particular handler is run and the exception is marked as handled. In another embodiment, the user supplies a single handler function, which is provided with the exception to potentially be handled. The function is run and can choose to react to the exception in any manner it deems fit. The function can then return a status indication of whether the exception should be treated as handled or not. The system then determines if any unhandled exceptions are still present. If one exception remains, then the system re-throws the specific exception (or a new aggregate exception object containing the specific exception). If more than one exception remains, a new aggregate exception object is constructed that includes the remaining unhandled exceptions, and the new aggregate exception object is thrown.

In a task-based system like the Microsoft® Parallel Extensions' Task Parallel Library, tasks or task objects are units of work that are scheduled to run concurrently. Creating and starting a new asynchronous task is sometimes referred to as "forking". Calling the "join" method of a task makes the calling thread wait until the task terminates. Each task has a body that includes some application-specific function call that takes some optional state. Because it is common for these asynchronous tasks to be waited on or joined with later, any exceptions that escape unhandled from the task's body can be caught, stored on the tasks, and later re-propagated when the joining task gets around to waiting on the task. However, if an exception has happened inside a first task, and another task is supposed to join with the first task but does not, the exception may go missing. The exception may have been indicative of serious problems that the application user should be made aware of, but the failure to join can result in the loss of this information. In addition, some tasks will never be joined with because the design does not call for it. An example of such tasks is initializing a list of thousands of futures; should their value be necessary, another task will join, but otherwise they are left as is. A task that is unlikely to be joined with according to one embodiment is referred to herein as a "fire-and-forget task".

The exception behavior of tasks will now be described in further detail with reference to the example task class given in the following Pseudo Code Example I, in which tasks are mapped to threads for illustration purposes:

PSEUDO CODE EXAMPLE I

```
class Task {
    Thread _t;
    Exception _e;
    public Task(Action body) {
        _t = new Thread(delegate( )
        {
            try {
                body( );
            } catch (Exception e) {
                _e = e;
            }
        });
        _t.Start( );
    }
    public void Wait( ) {
        _t.Join( );
        if (_e != null)
            throw _e:
    }
}
```

As shown in Example I, a task constructor creates a new thread (i.e., a new task) that executes a method "body" that is passed to it. The new task catches any exceptions thrown by the method "body", and stores the exceptions. When called, the Wait( ) method re-throws the exceptions after the join. The Join( ) method causes the object that called the Wait( ) method to wait for the new thread to finish executing its code. If the Wait( ) method is not called, the exceptions are not re-thrown and may go missing.

One embodiment provides efficient techniques to propagate exceptions out of tasks even when the tasks are never joined with, and provides the ability to compose multiple levels of nested tasks. In one embodiment, interoperability with a two-pass structured exception handling (SEH) system, of the kind that the Microsoft® Windows™ operating system employs, is provided to keep stacks around long enough for debugging. In one embodiment, fire-and-forget tasks are recognized and treated as a special case.

In one embodiment, the composition of exceptions among multiple tasks is handled by using a parent/child relationship: a task B created when task A is active (i.e., inside of task A's delegate) will result in task B being parented by task A (unless an API is used to specify otherwise). Just before the parent task A completes, it automatically calls Wait on all of its children. This accomplishes two things: (1) the parent task does not finish until all of its children have finished, and (2) any child exceptions are aggregated together and propagated as other tasks wait on the parent, its ancestors, etc. In one embodiment, two extensions are added to this scheme to provide for the handling of exceptions that would have otherwise gone unhandled and missing. The first extension is identifying and marking certain tasks as fire-and-forget tasks. A fire-and-forget task according to one embodiment is a task that is not likely to be waited on. In one embodiment, an opt-in strategy is used for fire-and-forget tasks. In another embodiment, the fire-and-forget designation is the default for tasks.

The second extension is to provide the ability for an exception to crash the process, or provide for a debugger to attach, in the case that a task becomes garbage collected without its exception having ever been seen.

The first extension (i.e., recognition of fire-and-forget tasks) involves the modification of the task class given in Pseudo Code Example I, as shown in the following Pseudo Code Example II:

PSEUDO CODE EXAMPLE II

```
class Task {
    Thread _t;
    Exception _e;
    public Task(Action body, bool isFireAndForget) {
        _t = new Thread(delegate( )
        {
            try {
                body( );
            } catch (Exception e) {
                _e = e;
                if (isFireAndForget)
                    throw;
            }
        });
        _t.Start( );
    }
    public void Wait( ) {
        _t.Join( );
        if (_e != null)
            throw _e;
    }
}
```

As shown in Example II, a task constructor creates a new thread (i.e., a new task) that executes the method "body". The new task is passed the Boolean flag "isFireAndForget", which indicates whether the new task is likely to be waited on (i.e., the task is not a fire-and-forget type task), or whether the task is not likely to be waited on (i.e., the task is a fire-and-forget type task). Like in Pseudo Code Example I, the new task in Example II catches any exceptions thrown by the method "body", and stores the exceptions. If the Boolean flag "isFireAndForget" is set, indicating that the new task is a fire-and-forget task that is not likely to be waited on, the new task re-throws the caught exceptions. Thus, for a fire-and-forget task according to one embodiment, any exceptions are caught and re-thrown by the task regardless of whether another object calls the task's Wait( ) method.

For the second extension (i.e., if a task becomes garbage collected without its exception having ever been seen, the exception will crash the process or provide the opportunity for a debugger to attach), there would be a large cost associated with imposing the overhead of finalization on each and every task. Instead, an exception-finalization-monitor (EFM) object is created in one embodiment, which monitors the task and whether its exceptions have been observed. In one embodiment, an EFM object is only allocated when an exception actually occurs, and the EFM object itself is finalizable, but the task is not. The task holds a reference to the EFM to ensure it is only garbage collected once the task also becomes unreachable. An example of an EFM class and a task class for implementing the second extension according to one embodiment is given in the following Pseudo Code Example III:

PSEUDO CODE EXAMPLE III

```
class EFM {
    Task _t;
    Exception _e;
    bool _wasObserved;
    EFM(Task t, Exception e) {
        _t = t;
        _e = e;
    }
    void Wait( ) {
        Suppress( );
        throw _e;
    }
    void Suppress( ) {
        wasObserved = true;
        GC.SuppressFinalize(this);
    }
    ~EFM( ) {
        Wait( );
    }
}
class Task {
    Thread _t;
    EFM _efm;
    public Task(Action body, bool isFireAndForget) {
        _t = new Thread(delegate( )
        {
            try {
                body( );
            } catch (Exception e) {
                _efm = new EFM(this, e);
                if (isFireAndForget)
                {
                    _efm.Suppress( );
                    throw;
                }
            }
        });
        _t.Start( );
    }
    public void Wait( ) {
        _t.Join( );
        if (_efm != null)
            _efm.Wait( );
    }
}
```

As shown in Example III, a task constructor creates a new thread (i.e., a new task) that executes the method "body". The new task is passed the Boolean flag "isFireAndForget", which indicates whether the new task is likely to be waited on (i.e., the task is not a fire-and-forget type task), or whether the task is not likely to be waited on (i.e., the task is a fire-and-forget type task). Like in Pseudo Code Examples I and II, the new task in Example III catches any exceptions thrown by the method "body", and stores the exceptions. If the Boolean flag "isFireAndForget" is set, indicating that the new task is a fire-and-forget task that is not likely to be waited on, the new task re-throws the caught exceptions. Thus, for a fire-and-forget task according to one embodiment, any exceptions are caught and re-thrown by the task regardless of whether another object calls the task's Wait( ) method.

As shown in Example III, when an exception is caught by the new task, a new EFM object is created, which stores the new task and the exception. When the Wait( ) method of the task is called, the Join( ) call causes the object that called the Wait( ) method to wait for the new thread to finish executing its code, and then the Wait( ) method of the EFM is called. The Wait( ) method of the EFM sets the Boolean flag "_wasObserved" equal to true, indicating that an object called wait on the new task and that the exception of the new task was observed. The Wait( ) method of the EFM then suppresses finalization of the finalization method "~EFM( )", to prevent this method from being executed by the garbage collector. The Wait( ) method of the EFM then re-throws the exception. If the Wait( ) method of the new task is not called, and the new task and its corresponding EFM object become subject to garbage collection, the finalization method "~EFM( )" of the EFM object will be executed by the garbage collector. The finalization method calls the Wait( ) method of the EFM object, which causes the exception to be re-thrown.

The net result of Example III according to one embodiment is that an EFM object gets created upon an exception, and this EFM object is responsible for propagating an exception if the task becomes unreachable and garbage collected. Both the task and its EFM object are collected at the same time in one embodiment by holding a circular reference (i.e., the task references the EFM, and vice versa).

One embodiment uses a garbage collection algorithm from the common language runtime (CLR) in the Microsoft® .NET Framework. The garbage collector figures out which blocks of memory are no longer being used by the application, frees that memory, and compacts the used memory into a contiguous block. The garbage collector provides a finalization feature that allows a resource to gracefully clean up after itself. When the garbage collector detects that an object is garbage, the garbage collector calls the object's finalization method (if it exists) and then the object's memory is reclaimed.

FIG. 1 is a diagram illustrating a multi-processor computing device 100 suitable for performing concurrent exception handling according to one embodiment. In the illustrated embodiment, the computing system or computing device 100 includes a plurality of processing units (e.g., processors) 102 and system memory 104. Depending on the exact configuration and type of computing device, memory 104 may be volatile (such as RAM), non-volatile (such as ROM, flash memory, etc.), or some combination of the two.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes a concurrent exception handling application 200. Concurrent exception handling application 200 is described in further detail below with reference to FIG. 2.

Figure 2:
FIG. 2 is a diagrammatic view of a concurrent exception handling application for operation on the computer system illustrated in FIG. 1 according to one embodiment.

FIG. 2 is a diagrammatic view of one embodiment of a concurrent exception handling application 200 for operation on the computing device 100 illustrated in FIG. 1. Application 200 is one of the application programs that reside on computing device 100. However, application 200 can alternatively or additionally be embodied as computer-executable instructions on one or more computers and/or in different variations than illustrated in FIG. 1. Alternatively or additionally, one or more parts of application 200 can be part of system memory 104, on other computers and/or applications 115, or other such suitable variations as would occur to one in the computer software art.

Concurrent exception handling application 200 includes program logic 202, which is responsible for carrying out some or all of the techniques described herein. Program logic 202 includes logic 204 for constructing a task object; logic 206 for executing a method by the task object; logic 208 for catching an exception with the task object during execution of the method; logic 210 for determining with the task object whether the exception is likely to be observed (e.g., whether the task object is likely to be waited on and thereby re-throw the exception); logic 212 for re-throwing the exception when it is determined by the task object that the exception is not likely to be observed (e.g., the task object is not likely to be waited on by another object); logic 214 for creating a monitoring object in response to the exception that is configured to re-throw the exception in response to the task object being garbage collected without the exception having been observed, and that includes a finalization method configured to be executed by a garbage collection system to re-throw the exception in response to the exception not being observed; logic 216 for forwarding the exception to a coordination element; logic 218 for aggregating the exception with other thrown exceptions into an aggregation exception structure; logic 220 for determining whether the aggregation exception structure will be handled by an exception handler; logic 222 for unwinding the task object when it is determined that the aggregation exception structure will be handled, and preventing unwinding of the task object when it is determined that the aggregation exception structure will not be handled; and other logic 224 for operating the application.

Figure 3:
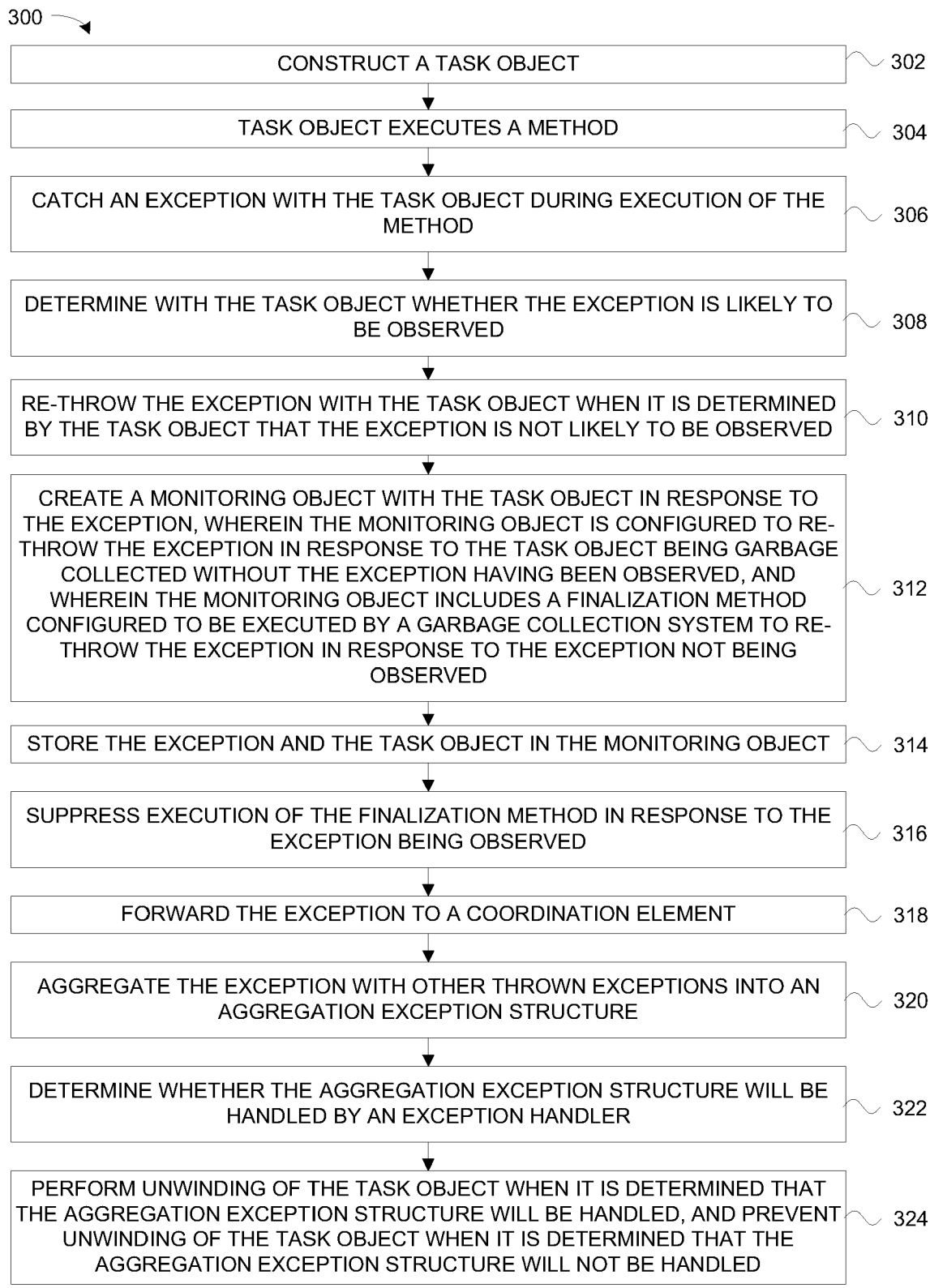
FIG. 3 is a flow diagram illustrating a method of handling an exception in a parallel system according to one embodiment.

Turning now to FIG. 3, techniques for implementing one or more embodiments of concurrent exception handling application 200 are described in further detail. In some implementations, the techniques illustrated in FIG. 3 are at least partially implemented in the operating logic of computing device 100.

FIG. 3 is a flow diagram illustrating a method 300 of handling an exception in a parallel system according to one embodiment. At 302 in method 300, a task object is constructed. At 304, a method is executed by the task object. At 306, the task object catches an exception during execution of the method. At 308, the task object determines whether the exception is likely to be observed (e.g., whether the task object is likely to be waited on by another object and thereby re-throw the exception). At 310, the task object re-throws the exception when it is determined by the task object that the exception is not likely to be observed (e.g., the task object is a fire-and-forget task that is not likely to be waited on by another object).

At 312 in method 300, a monitoring object is created by the task object in response to the exception, wherein the monitoring object is configured to re-throw the exception in response to the task object being garbage collected without the exception having been observed, and wherein the monitoring object includes a finalization method configured to be executed by a garbage collection system to re-throw the exception in response to the exception not being observed. In one embodiment, the monitoring object created at 312 is configured to cause the exception to be propagated in response to the task object becoming inaccessible without the exception having been observed. At 314, the exception and the task object are stored in the monitoring object. At 316, execution of the finalization method is suppressed in response to the exception being observed.

At 318 in method 300, the exception is forwarded to a coordination element. At 320, the exception is aggregated with other thrown exceptions into an aggregation exception structure. In one embodiment, the aggregate exception structure is an aggregate exception object that is configured to store multiple exceptions and related details, such as stack trace, thread ID, and/or API specific information about the concurrent operation that threw the forwarded exception to help in debugging. At 322, it is determined whether the aggregation exception structure will be handled by an exception handler. At 324, unwinding of the task object is performed when it is determined that the aggregation exception structure will be handled, and prevention of unwinding of the task object is performed when it is determined that the aggregation exception structure will not be handled. In one embodiment, the forwarding, aggregating, and determining steps occur in a first pass of a two-pass structured exception handling system, and the unwinding step occurs in a second pass of the two-pass structured exception handling (SEH) system.

In one embodiment of method 300, a two-pass structured exception handling system is used in order to improve debuggability, even if a task is never actually waited on. Structured exception handling, which is a Windows exception handling mechanism that both Visual C++ and Microsoft® .NET Common Language Runtime (CLR) exceptions are built on top of, executes two passes or phases when an exception occurs: (1) a search pass; and (2) an unwind pass. In the first pass, the current stack is searched for an appropriate handler, which involves checking the type of the exception against the catch clause types and, in some cases (like C++ and Visual Basic), executing predicate-based exception filters. If no user-mode handler was found, the default OS exception filter sitting at the top of all thread stacks will take action. If a debugger is attached, it is notified of the unhandled exception. Otherwise, the standard "Unhandled Exception" dialog is shown that allows a user to crash the process, attach a debugger, and/or capture a crash dump. In the second pass, the stack is actually unwound to the point of catch, and the handler is executed. During the process of unwinding, any finally blocks on the thread's stack are run. One embodiment interacts with a two-pass structured exception handling system. In one embodiment, the exception handling system provides notifications during the search phase. For example, notifications may occur when a handler is found for an exception or when it is determined that no handler exists.

One embodiment provides a concurrent exception handler application that uses a structured exception handling two-pass model to keep stacks around long enough for debugging, and provides interoperability with the stack unwind mechanism to free up stacks as quickly as possible. One embodiment of the concurrent exception handler provides the ability to crash a thread on which an exception actually occurred, as opposed to the thread the exception got marshaled to, in order to provide good debugging and crash dumps. The use of a two-pass SEH system is described in further detail in commonly-assigned U.S. patent application Ser. No. 12/330,718, filed on Dec. 9, 2008, and entitled HANDLING EXCEPTIONS IN A DATA PARALLEL SYSTEM, which is hereby incorporated by reference herein.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of handling an exception in a parallel system, comprising:
    constructing a task object;
    executing a method with the task object;
    catching an exception with the task object during execution of the method;
    causing the exception to be propagated in response to the task object becoming inaccessible without the exception having been observed;
    creating a monitoring object with the task object in response to the exception, wherein the monitoring object is configured to re-throw the exception; and
    wherein the monitoring object is configured to re-throw the exception in response to the task object becoming inaccessible by being garbage collected without the exception having been observed.

2. The method of claim 1, wherein the monitoring object includes a finalization method configured to be executed by a garbage collection system to re-throw the exception in response to the exception not being observed.

3. The method of claim 2, and further comprising:
    suppressing execution of the finalization method in response to the exception being observed.

4. The method of claim 1, and further comprising:
    storing the exception and the task object in the monitoring object.

5. The method of claim 1, and further comprising:
    determining with the task object whether the exception will be observed.

6. The method of claim 5, and further comprising:
    re-throwing the exception with the task object when it is determined by the task object that the exception will not be observed.

7. The method of claim 1, and further comprising:
    forwarding the exception to a coordination element; and
    aggregating the exception with other thrown exceptions into an aggregation exception structure.

8. The method of claim 7, and further comprising:
    determining whether the aggregation exception structure will be handled by an exception handler; and
    unwinding the task object when it is determined that the aggregation exception structure will be handled.

9. The method of claim 8, and further comprising:
    preventing unwinding of the task object when it is determined that the aggregation exception structure will not be handled.

10. The method of claim 8, wherein the forwarding, aggregating, and determining steps occur in a first pass of a two-pass structured exception handling system.

11. The method of claim 10, wherein the unwinding step occurs in a second pass of the two-pass structured exception handling system.

12. A method of handling an exception in a parallel system, comprising:
- constructing a task object;
- executing a method with the task object;
- catching an exception with the task object during execution of the method;
- determining with the task object whether the exception will be observed;
- re-throwing the exception with the task object when it is determined by the task object that the exception will not be observed;
- creating a monitoring object with the task object in response to the exception, wherein the monitoring object is configured to re-throw the exception; and
- wherein the monitoring object is configured to re-throw the exception in response to the task object being garbage collected without the exception having been observed.

13. The method of claim 12, and further comprising:
- storing the exception and the task object in the monitoring object.

14. The method of claim 12, wherein the monitoring object includes a finalization method configured to be executed by a garbage collection system to re-throw the exception in response to the exception not being observed.

15. The method of claim 14, and further comprising:
- suppressing execution of the finalization method in response to the exception being observed.

16. The method of claim 12, and further comprising:
- forwarding the exception to a coordination element; and
- aggregating the exception with other thrown exceptions into an aggregation exception structure.

17. The method of claim 16, and further comprising:
- determining whether the aggregation exception structure will be handled by an exception handler;
- unwinding the task object when it is determined that the aggregation exception structure will be handled; and
- preventing unwinding of the task object when it is determined that the aggregation exception structure will not be handled.

* * * * *